United States Patent Office.

IMPROVEMENT IN COMPOSITION FOR THE CURE OF AGUE.

JOHN MONFORT, OF JESSAMINE COUNTY, KENTUCKY, ASSIGNOR TO HIMSELF AND G. E. BILLINGSLEY.

Letters Patent No. 60,538, dated December 18, 1866.

*The Schedule referred to in these Letters Patent and making part of the same.*

TO ALL WHOM IT MAY CONCERN:

Be it known that I, JOHN MONFORT, of the county of Jessamine, and State of Kentucky, have invented a new and useful Composition of Matter; and I do hereby declare that the following is a full, clear, and exact description of the same, reference being had to the specimens of ingredients herewith filed.

This composition is a medicinal preparation for the treatment of ague, and it is compounded as follows, viz: Take 1¼ oz. blood root or *Sanguinaria canadensis*, and ¼ oz. yellow root or *Hydrastis canadensis*, and pour over them one pint of whiskey, and allow the same to steep for one month. The tincture thus prepared is then drawn off and bottled for use. It is administered in cases of ague, when the chill is coming on, in tablespoonful doses. The quantity may be increased, when the patient is not sickened by the administration, to a tablespoonful and a half. The dose should be repeated every day at the same hour until a cure is effected. The above dose is the one proper for an adult; for children the dose must be proportioned according to the age of the patient.

Having fully explained the mode of compounding and administering this preparation, what I claim as my invention, and desire to secure by Letters Patent, is—

A composition of matter composed, compounded, and prepared substantially as and for the purpose set forth.

In testimony whereof I have signed my name to this specification in the presence of two subscribing witnesses.

JOHN MONFORT.

Witnesses:
E. J. CURLEY,
B. O. BILLINGSLEY.